Jan. 15, 1929.
A. KOCHER
1,698,916
DETACHABLE COVER FOR COOKING VESSELS
Filed Dec. 29, 1927
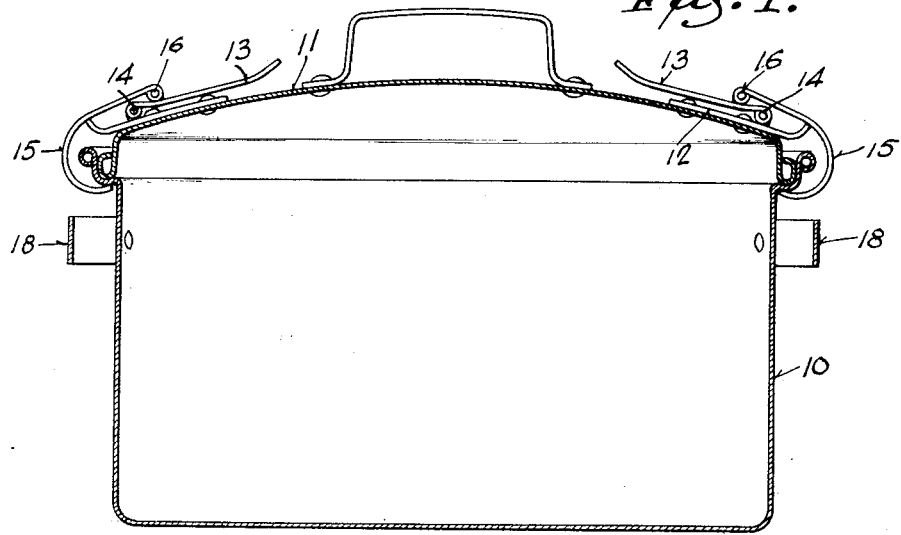
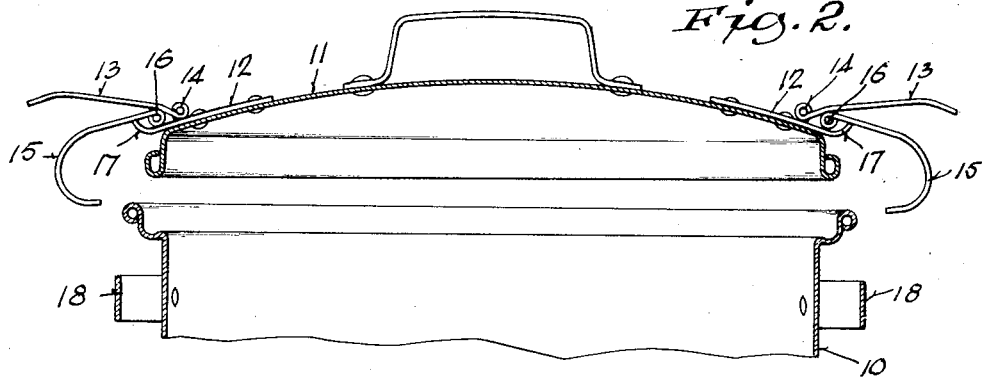
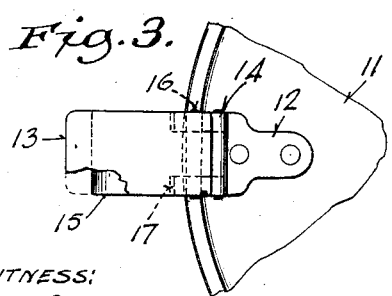
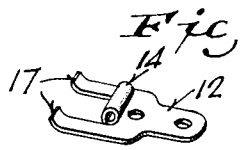
WITNESS:
INVENTOR.
ALFRED KOCHER,
BY
ATTORNEYS.

Patented Jan. 15, 1929.

1,698,916

UNITED STATES PATENT OFFICE.

ALFRED KOCHER, OF WEST BEND, WISCONSIN, ASSIGNOR TO WEST BEND ALUMINUM COMPANY, OF WEST BEND, WISCONSIN, A CORPORATION OF WISCONSIN.

DETACHABLE COVER FOR COOKING VESSELS.

Application filed December 29, 1927. Serial No. 243,249.

The invention relates to cooking vessels of the pressure type, and it resides in such a vessel and a detachable cover therefor. The cover is held in closed position by means of clamps of peculiar construction, which clamps are mounted upon the cover in such relation that they may be made to engage the vessel, and so hold the cover in effective position upon the vessel.

The clamps used in connection with the present invention, are of the type illustrated in Patent No. 1,641,681, granted September 6, 1927, to Ralph N. Kircher. In general, the formation of the vessel and its cover is quite similar to the type shown in the said patent.

My invention relates partitcularly to the clamp, and I have devised an improvement thereon which renders the same more nearly automatic in its operation, by the prevention and elimination of some movements heretofore performed manually in attaching the cover to the vessel and detaching it therefrom.

This result I achieve by forming as a part of the clamp, a stop which acts to support the hook in an outward position, upon an unclamping movement of the clamping lever, so that the hook is maintained clear of the vessel, to permit the removal of the cover without a manual operation of the hook.

In the construction illustrated, I utilize the clamping lever in its free position, as a counterbalance for the hook, the said lever causing the hook to pivot about the stop, and thus maintain the free end of the hook clear of the vessel.

Having thus outlined the nature of my invention, I will now describe the same specifically, and point out the novelty thereof in the appended claims.

In the accompanying drawing:

Figure 1 is a vertical transverse sectional view through the cooker and its cover near the diametral line, showing the manner in which my invention is applied thereto.

Fig. 2 is a similar view, but showing only the upper part of the vessel, with the hooks withdrawn from engagement with the vessel, and the cover slightly raised from the vessel, the view illustrating the position automatically assumed by the hooks when the clamping levers are moved to their free position.

Fig. 3 is a plan view of a portion of the cover, with one of the clamps in the position illustrated in Fig. 2.

Fig. 4 is a perspective view of the bracket forming a part of the clamp, and illustrating the formation of the stops for supporting the hooks, for the purposes of my invention.

In the drawing, the numeral 10 indicates the vessel, the vertical walls of which are surmounted by a ledge formed by bending outwardly the metal thereof, which is then turned upwardly in parallelism with the walls and finished with a bead, to give stability to the rim of the wall. The ledge referred to forms a seat, upon which rests the bead at the lower edge of the flange depending from the cover 11, the construction in these respects being quite similar to what is shown in the patent before mentioned.

Attached to the cover at opposite points thereon are clamps, the purpose of which is to engage the cover 11 with the vessel 10 in such manner that a tight joint is effected. Usually four clamps, set quartering, will be applied to the cover. The clamps comprise a bracket 12 which is attached to the cover, a clamping lever 13 pivoted at 14 on the bracket, and a hook 15 pivoted at 16 to the clamping lever 13 at a point intermediate the pivotal connection with the bracket 12 and its free end. In Fig. 1, the clamps are shown as in operative position, with the hooks in engagement with the underside of the ledge at the top of the vessel.

I provide the bracket 12 with a projection or projections 17, extending outwardly from the cover and in a position in which they will act as stops to limit the movement of the hook when the latter is in its disengaged position, and support the hook clear of the vessel, so that the cover may be readily removed from the vessel without manual operation of the hook.

In the prior patented construction, with the clamping lever 13 thrown outwardly into unclamping position, to release the pull upon the hook, the hook remained with its free end in the vertical plane of the ledge at the top of the vessel. To remove the hook from that position, so that the cover might be raised, it was necessary to throw both the hook and the clamping lever back onto the cover, this requiring four manual operations in using the vessel. But by providing the projections or stops 17 in the position shown, the outward movement of the clamping lever 13 causes the hook 15 to pivot over the end of the stop 17, the weight of the clamping lever serving to overbalance the hook and depress the pivotal point 16 into engagement with the upper side of the stop 17. The effect of this movement is to automatically withdraw the end of the hook outwardly into a position in which it is clear of the vessel, and thus permit the cover to be removed with greater facility.

The automatic positioning of the hooks through the operation of the devices described, likewise serves to prevent interference when the cover 11 is placed upon the vessel. It is necessary only to seat the cover upon the vessel and rotate the clamping levers 13 inwardly, whereupon the hooks automatically assume the engaged positions shown in Fig. 1.

The vessel will be equipped with lifting handles 18, attached at opposite points on its sides. Preferably these handles will be wholly below the operating plane of the hooks, so that in placing the cover upon the vessel, it may be arranged at random, as the handles will not interfere with the hooks, and so selective positioning of the cover is avoided.

Having thus described my invention, what I claim and desire to secure by Letters Patent of the United States, is:

1. A cooking utensil comprising a vessel having an upstanding side wall, a cover therefor adapted to be seated on the said side wall, hooks pivoted on the cover and adapted to engage the vessel to secure the cover, upon the vessel, and means on the cover for maintaining the hooks away from the vessel when the cover is being applied to or removed from the vessel.

2. A cooking utensil comprising a vessel having an upstanding side wall, a cover adapted to be seated on the said side wall, clamps attached to the cover for engagement with the vessel for retaining the cover in position, such clamps comprising a pivotally mounted clamping lever, a hook pivotally connected thereto and adapted to engage the vessel to retain the cover in position thereon, and means for holding the hooks away from the vessel while the cover is being applied to or removed therefrom.

3. In a device for clamping a cover upon a cooking vessel, a bracket mounted on the said cover, a clamping lever pivotally connected to the said bracket, a hook pivoted to the said lever and engageable with the vessel for clamping the cover thereto, and a stop on the cover adapted to support the hook clear of the vessel while the cover is being applied thereto or removed therefrom.

4. In a device for clamping a cover upon a cooking vessel, a bracket mounted on the cover and having an outward extension forming a stop, a clamping lever pivoted on the bracket, a hook pivoted on the clamping lever for engagement with the vessel to hold the cover thereon, the said hook in the outward movement of the clamping lever being brought into engagement with the said stop so as to maintain the hook clear of the vessel while the cover is being applied to or removed therefrom.

5. In a device for clamping a cover to a cooking vessel, a bracket mounted on the said cover and having an outward extension forming a stop, a clamping lever pivoted on the said bracket, a hook pivoted to the said clamping lever at a point between the pivotal point and free end of the latter, the said hook in the outward movement of the clamping lever being brought into engagement with the said stop so as to maintain the hook clear of the vessel while the cover is being applied to or removed therefrom.

In testimony whereof, I have signed my name at West Bend, this 20th day of December, 1927.

ALFRED KOCHER.